(12) United States Patent
Dajaku et al.

(10) Patent No.: US 9,800,194 B2
(45) Date of Patent: Oct. 24, 2017

(54) POWER SUPPLY UNIT AND ELECTRIC MACHINE

(71) Applicants: FEAAM GmbH, Neubiberg (DE); Universitaet der Bundeswehr Munich, Neubiberg (DE)

(72) Inventors: Gurakuq Dajaku, Neubiberg (DE); Florian Bachheibl, Munich (DE); Dieter Gerling, Holzkirchen (DE)

(73) Assignee: VOLABO GMBH, Holzkirchen (DE)

( * ) Notice: Subject to any disclaimer, the term of this patent is extended or adjusted under 35 U.S.C. 154(b) by 0 days.

(21) Appl. No.: 14/965,801

(22) Filed: Dec. 10, 2015

(65) Prior Publication Data

US 2016/0173019 A1    Jun. 16, 2016

(30) Foreign Application Priority Data

Dec. 10, 2014   (DE) .................. 10 2014 118 356

(51) Int. Cl.
*H02P 1/00*      (2006.01)
*H02P 25/22*     (2006.01)
(Continued)

(52) U.S. Cl.
CPC ............. *H02P 25/22* (2013.01); *H02K 3/12* (2013.01); *H02K 3/28* (2013.01); *H02P 27/04* (2013.01);
(Continued)

(58) Field of Classification Search
CPC . H02K 11/33; H02K 3/12; H02K 3/28; H02P 27/04
See application file for complete search history.

(56) References Cited

U.S. PATENT DOCUMENTS 6,232,731 B1 *  5/2001  Chapman .................. H02P 6/28
                                              318/400.39
6,922,037 B2    7/2005  Edelson
(Continued)

FOREIGN PATENT DOCUMENTS

DE         10157257 A1    7/2002
DE     102005032965 A1    3/2007
(Continued)

OTHER PUBLICATIONS

Chapman, P.L. et al.: "Optimal Current Control Strategies for Surface-Mounted Permanent-Magnet Synchronous Machine Drives", IEEE Transactions on Energy Conversion, vol. 14, No. 4, Dec. 1999, pp. 1043-1050.

*Primary Examiner* — Karen Masih
(74) *Attorney, Agent, or Firm* — McDermott Will & Emery LLP

(57) ABSTRACT

The invention relates to a power supply unit for supplying multiple conductor portions (3) of a stator winding of an electric machine which are inserted in respective slots (2), wherein the power supply unit is configured to supply a first conductor portion and a second conductor portion with at least one different operating parameter of a respective current function and/or the power supply unit is configured to supply a conductor portion with at least two superimposed current functions, which in each case have at least one different operating parameter. Furthermore, the invention relates to an electric machine having such a power supply unit.

16 Claims, 13 Drawing Sheets

Figure 3A:
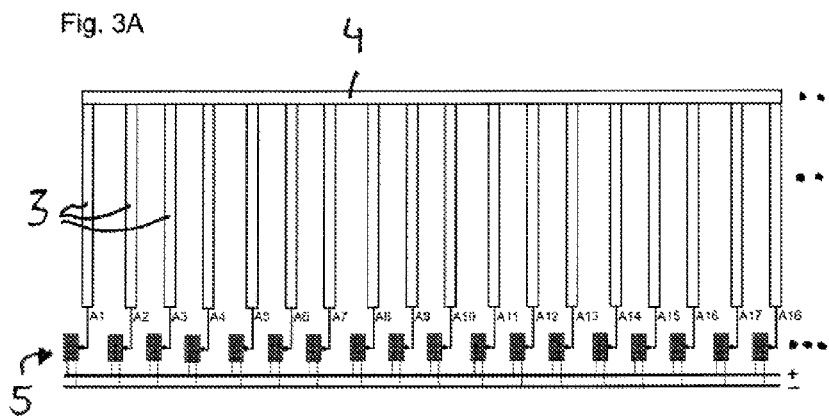

(51) Int. Cl.
*H02K 3/28* (2006.01)
*H02P 27/04* (2016.01)
*H02K 3/12* (2006.01)
*H02K 11/33* (2016.01)

(52) U.S. Cl.
CPC .......... *H02K 11/33* (2016.01); *H02K 2213/12* (2013.01)

(56) References Cited

U.S. PATENT DOCUMENTS

| | | |
|---|---|---|
| 2002/0093200 A1 | 7/2002 | Stefanovic et al. |
| 2002/0170738 A1* | 11/2002 | Inoue ............... H01B 7/08 174/110 R |
| 2007/0035193 A1 | 2/2007 | Huth et al. |
| 2010/0201399 A1* | 8/2010 | Metzner ............ H04L 25/028 326/83 |
| 2016/0105063 A1 | 4/2016 | Bachheibl |

FOREIGN PATENT DOCUMENTS

| | | |
|---|---|---|
| DE | 102009027028 A1 | 12/2010 |
| DE | 10394335 B4 | 7/2014 |
| DE | 102013102900 A1 | 9/2014 |
| DE | 102014105642 A1 | 10/2015 |
| DE | 102014114615 A1 | 5/2016 |
| WO | 2014/147181 A2 | 9/2014 |
| WO | 2015/162135 A1 | 10/2015 |

\* cited by examiner

Fig. 1A
Fig. 1B
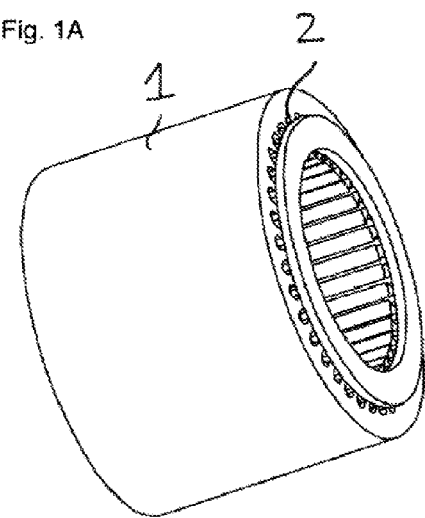
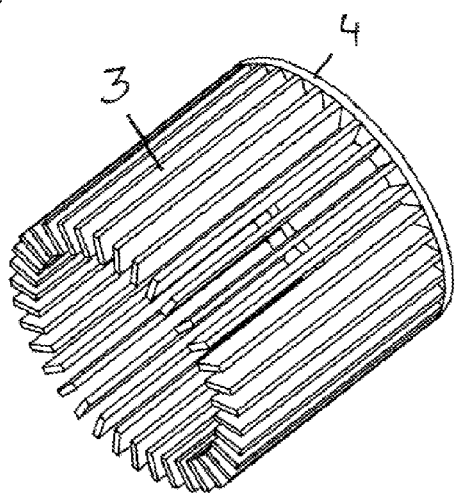
Fig. 2
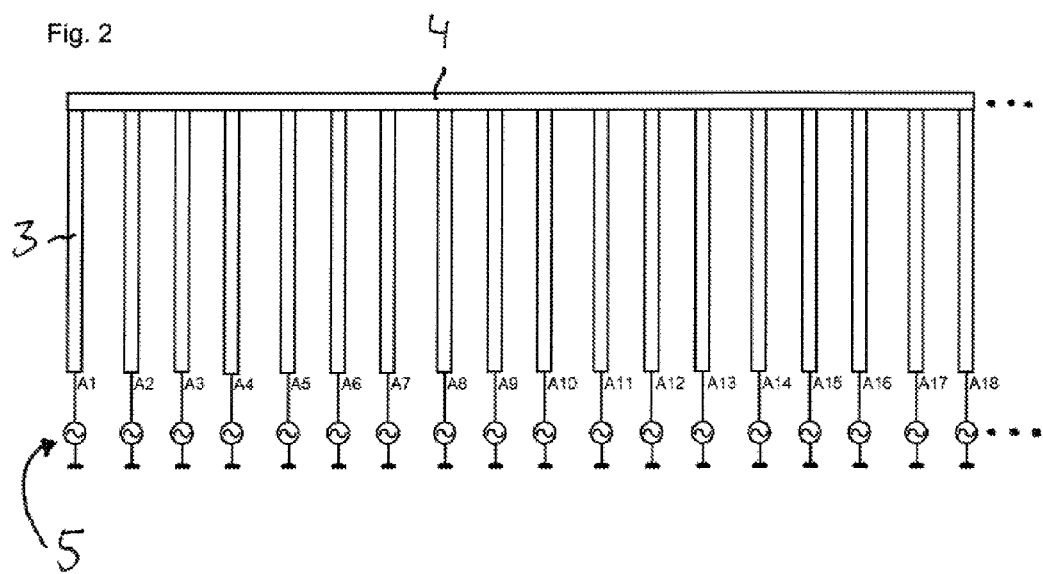

POWER SUPPLY UNIT AND ELECTRIC MACHINE

This patent application claims the priority of German patent application 10 2014 118 356.8, the disclosure content of which is hereby incorporated by reference.

The present invention relates to a power supply unit for supplying conductor portions of a stator winding of an electric machine as well as en electric machine having the power supply unit.

The stator of an electric machine usually comprises electric windings, which are connected to an electric power system, which in turn often has a multiphase configuration.

Distributed windings are often used in applications having more than two coils per pole per phase. Such distributed windings have numerous disadvantages, such as an increased manufacturing expenditure caused by superposition of the coils.

However, the essential advantage of the distributed winding lies with the fact that the magnetomotive force in the air gap between the stator and a rotor of the machine supported to be moveable relative to said stator has a smaller portion of overtones, i.e. less amount of undesired harmonics of the magnetomotive force. This results in high performance of the machine, which includes little rotor loss, little noise level and little vibration problems.

Another disadvantage of the conventional distributed winding is to be traced back to the complex winding head. Long wires for connecting the conductor portions inserted into the slots of the stator are required there in order to bridge over distances over a multitude of stator teeth.

Both the distributed winding and the tooth-based winding have the disadvantage that the operating parameters such as the pole pair number are set when designing said windings and cannot be altered during operation.

It is therefore desirable to combine the good electric properties of the distributed winding with a decreased manufacturing expenditure and an increased flexibility when operating the machine.

This object is achieved by the power supply unit as well as by the electric machine according to the independent claims. Embodiments and advantageous further developments are indicated in the respective subclaims.

According to the principles proposed, a power supply unit configured for supplying multiple conductor portions of a stator winding of an electric machine is provided. Here, the conductor portions are inserted in respective slots of the stator of the electric machine.

In turn, the power supply unit supplies a first of the conductor portions and a second of the conductor portions with at least one different operating parameter of a respective current function. As an alternative or in addition, the power supply unit is configured to supply a conductor portion with at least two superimposed current functions, which in each case have at least one different operating parameter.

In the first case mentioned, it is of course also possible to supply more than two conductor portions with respective different operating parameters of a respective current function. According to the principles proposed, it is of course also possible that a conductor portion is supplied with more than two superimposed current functions. Advantageously, the supply with at least two superimposed current functions per conductor portion is possible for multiple conductor portions or all conductor portions of the stator winding.

In one embodiment the conductor portions are oriented essentially parallel to one another and run in parallel slots of the stator.

In one embodiment the conductor portions are provided with two terminals, which can be provided at opposing ends of the conductor portions, for example. In each case one first terminal of the conductor portions is coupled to the power supply unit. In the respective second terminal, the conductor portions are electrically connected to one another by forming a short-circuit. This may be realized by means of a short-circuit-ring, for example.

In one embodiment in each case one DC-bus having one bar for the positive supply voltage and one bar for the negative supply voltage +/− is provided on both face sides i.e. on both ends of the conductor portions of the machine. Each DC bus may comprise two ring-shaped conductors. The conductor portions can be coupled to both DC buses +/− via half bridges 4, 5. The two DC buses may be coupled to the power supply unit. As an alternative, one of the two DC buses may be coupled to a capacitor.

The structure of the stator winding may correspond to the structure of a cage rotor, wherein one of the two short-circuit-rings of the cage rotor is removed. This proves that the stator winding can be manufactured with little effort.

The different operating parameter by means of which the current function is formed for different conductor portions or the same conductor portion may include the pole pair number, frequency, phase angle and/or amplitude of the current function, for example.

In one embodiment it is provided to supply the stator winding with current functions of different pole pair number at the same time. For example, a first conductor portion may be supplied with a current function having a first pole pair number and another conductor portion may be supplied with a current function having another pole pair number. As an alternative or in addition, the current functions of different pole pair number may be superimposed to one another and supplied to multiple conductor portions.

As will be explained later by means of the exemplary embodiments, this provides significant advantages for a flexible, highly-efficient operation of the machine in the most different operating states.

In other words, each conductor portion represents a phase winding of the stator winding and receives an individually adjustable power supply with a current function or a superposition of current functions, the operating parameters of which differ from the current functions of other conductor portions. In the case of the superposition of current functions for supplying one or more conductor portions, at least two of the current functions have at least one different operating parameter.

It is obvious that, by means of the principle proposed, a stator winding can be produced that is manufactured in a particularly simple manner. The winding head can also be manufactured in a particularly simple manner, since it consists of a short-circuit-ring in the simplest case. The conductor length by means of which the power supply unit is connected to the conductor portions may be almost arbitrarily short.

The individual generation of phase currents and different current functions for supplying the conductor portions allows to achieve, by means of the principle proposed, the distributions of the harmonic of the magnetomotive force that are also possible by means of distributed windings. The term harmonic refers to the components of the magnetomotive force that may for example be illustrated by means of a Fourier decomposition.

According to the proposed principle, it is of course possible to load the same or different conductor portions with current functions having different frequencies. Here, the amplitude and frequency of the current functions of different pole pairs may also be set independently from one another. This in turn allows, according to the proposed principle, to generate a torque resulting from a combination of synchronous and asynchronous operations of the electric machine.

Further, the machine can be operated with different numbers of active phases, with the number of the electric phases being changeable even during operation. As already explained, the number of pole pairs can be changed even during operation.

As an alternative or in addition, the machine can also be operated with multiple pole pairs at the same time by means of superposition, wherein either conductor portions of a first group having a first pole pair number and conductor portions of a second group having another pole pair number are operated, or it is possible to operate one or multiple conductor portions by superposition of current functions, where a first current function corresponds to a first pole pair number and a second current function corresponds to a second pole pair number.

Individual conductor portions can be deactivated. In this case or in the case of different operating parameters of the conductor portions, patterns may be formed that are fixed over the conductor portions or that move over the conductor portions, for example in an alternating or rotating manner.

The operating parameters and thus the current functions of the current portions can be adjusted such that a maximum efficiency of the operation is achieved for the respective application and/or for the respective operating state of the machine.

Another optimization option aims at maximizing the life cycle of the system.

Symmetric or asymmetric distributions of the magnetomotive force in the air gap of the machine can be generated by means of the proposed principle.

The current functions with which the individual conductor portions are supplied and which can be superimposed to one another can be described by an equation as follows:

$$I_{S,k}(t) = \sum_{i=p_0}^{p_{max}} \sum_{j=f_0}^{f_{max}} A_{i,j,k}(t) \cdot \cos\left(2\pi j t - i(k-1)\frac{2\pi}{Q_s} + \varphi_{i,j,k}(t)\right)$$

Here, $I_{S,k}(t)$ is the time-dependent current course, i.e. the time-dependent current function in a conductor portion of the stator having the consecutive numbering k, $A_{i,j,k}(t)$ is the time-dependent amplitude of each spectral component of the conductor portion k, wherein spectral component refers to a component of the current function for example in the case of a Fourier decomposition, j refers to the frequency of the spectral component; with $f_o$ being a first frequency and $f_{max}$ being the maximum occurring frequency, i refers to the pole pair number of the spectral component; with $p_o$ being a first pole pair number and $p_{max}$ being the maximum occurring pole pair number, $Q_s$ refers to the number of slots in the stator and thus also the number of conductor portions in the stator, $\varphi_{i,j,k}(t)$ refers to the time-dependent phase angle of each spectral component of the conductor portion k.

In one embodiment, an electric machine comprises a stator. Further, the machine comprises a power supply unit as described above. The stator comprises a multitude of slots which serve to accommodate the stator winding. Here, in each case one conductor portion of the stator winding is inserted per slot. The conductor portions are short-circuited on a first side of the stator. A short-circuit-ring may be provided to that end, for example. Further, the conductor portions are each connected to a terminal of the power supply unit on a second side of the stator opposite the first side. As described above in detail, the power supply unit is configured to generate at least two current functions. The current functions have at least one operating parameter differing from one another. Said at least two current functions are fed into different conductor portions of the stator winding and/or superimposed in one or multiple conductor portions. With respect to further details on possible configurations and the advantageous effect of the stator winding, reference is made to the previous application DE 10 2014 105 642.6, filed on 22 Apr. 2014, incorporated herein in its entirety.

In another embodiment, it is provided—instead of the short-circuit ring—to connect the conductor portions at the first side of the stator to another power supply unit, for example in each case via half bridges. With respect to possible configurations and to the advantageous effect of such a machine being fed on two sides, reference is made to the previous application DE 10 2014 114 615.8, filed on 8 Oct. 2014, incorporated herein in its entirety.

In one embodiment, the conductor portions inserted into the slots are formed in a straight manner.

For example, the conductor portions may have the same geometric shape and may be oriented parallel to one another along the periphery of stator. The conductor portions may include aluminum rods, copper rods, bronze rods or alloys thereof.

The short-circuit ring of the stator winding may include a cooling channel.

Further details and configurations of the proposed principle will be explained in the following by means of multiple exemplary embodiments and the respective figures.

Figure 10:
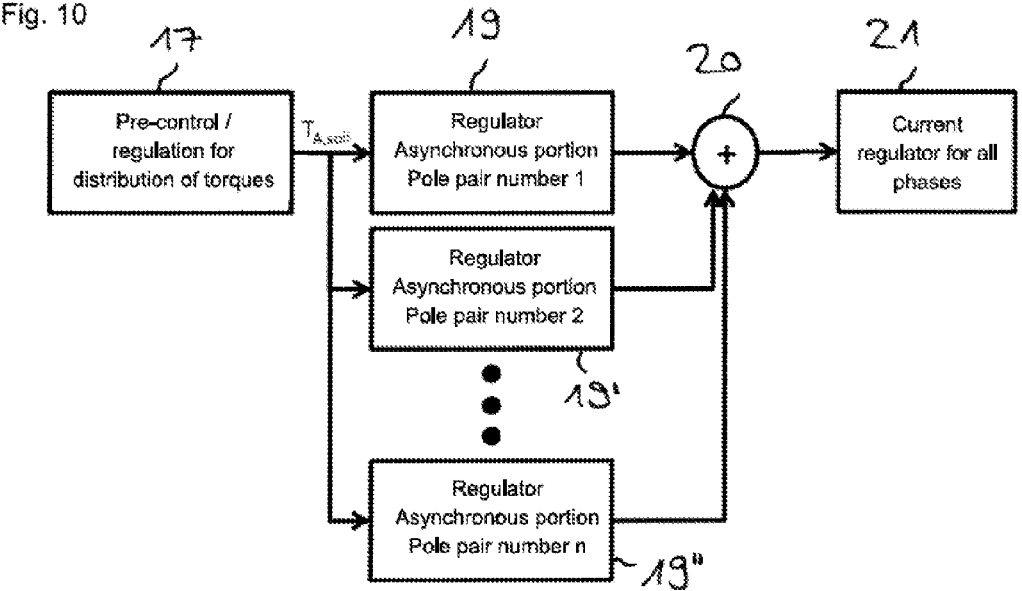
Figure 11:
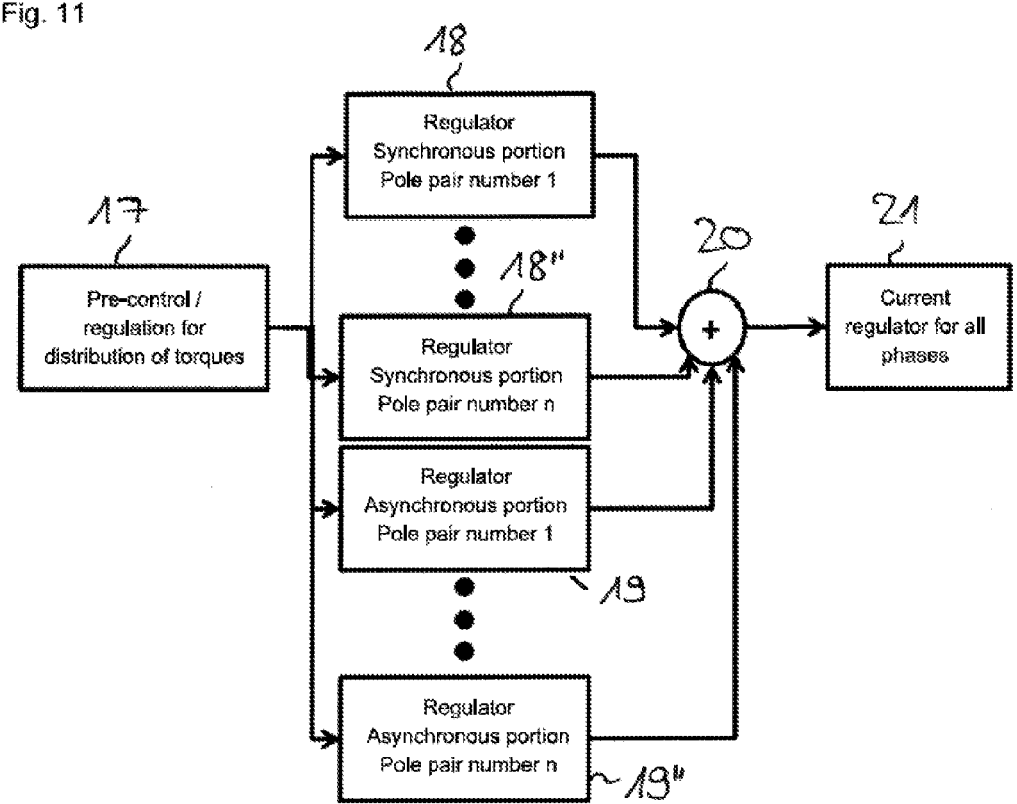
Figure 12A:
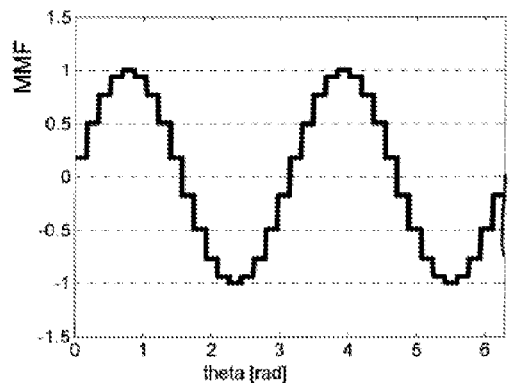
Figure 12B:
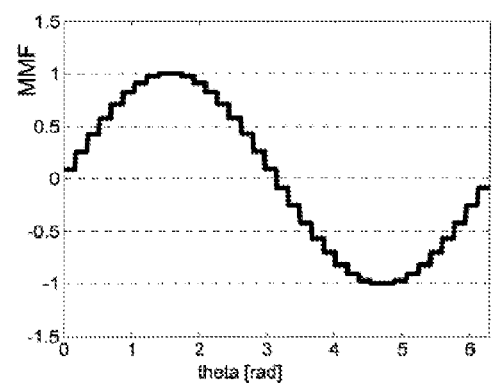
Figure 13:
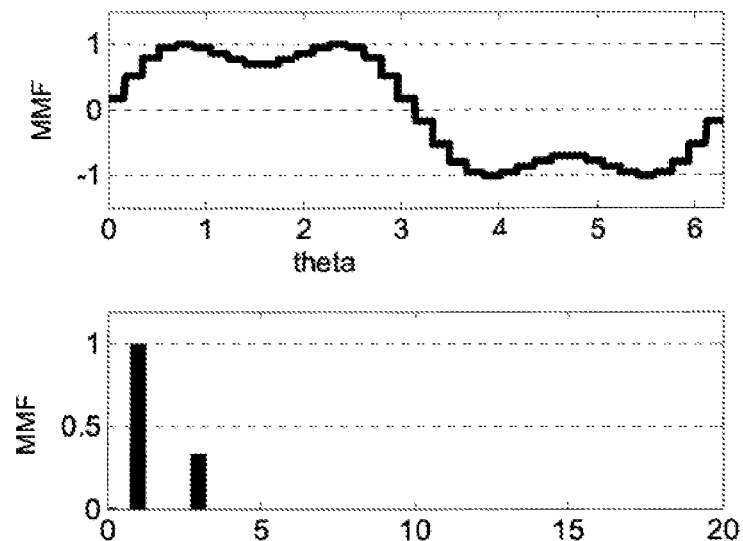
Figure 24:
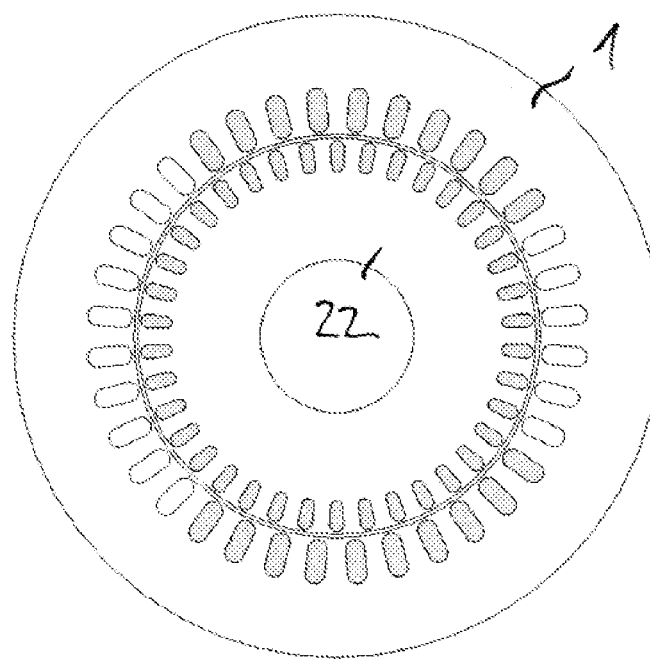
Figure 25:
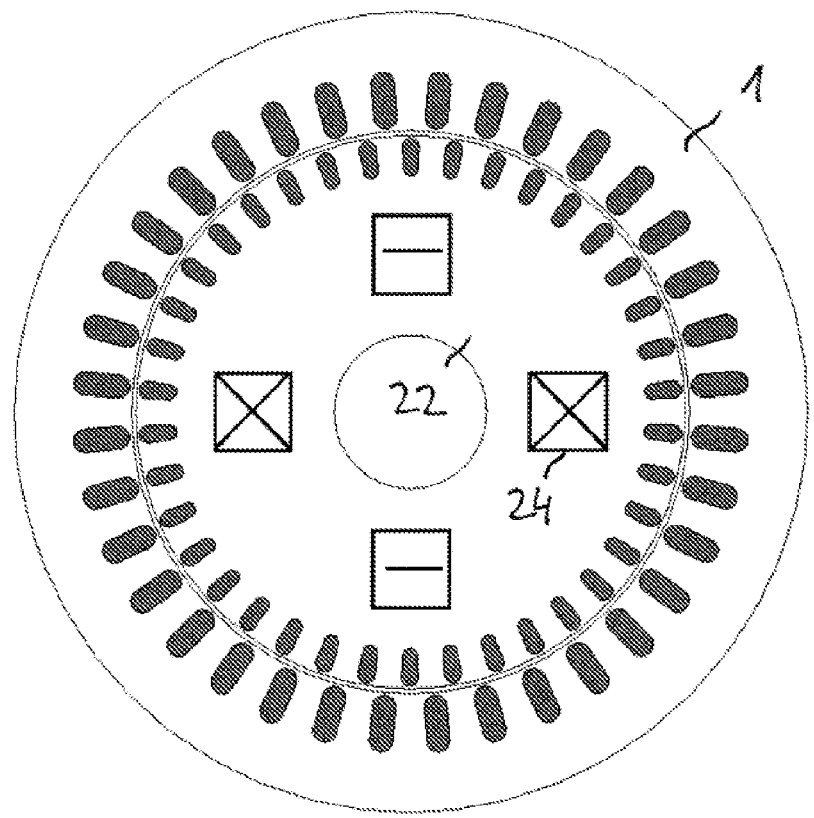
Figure 26:
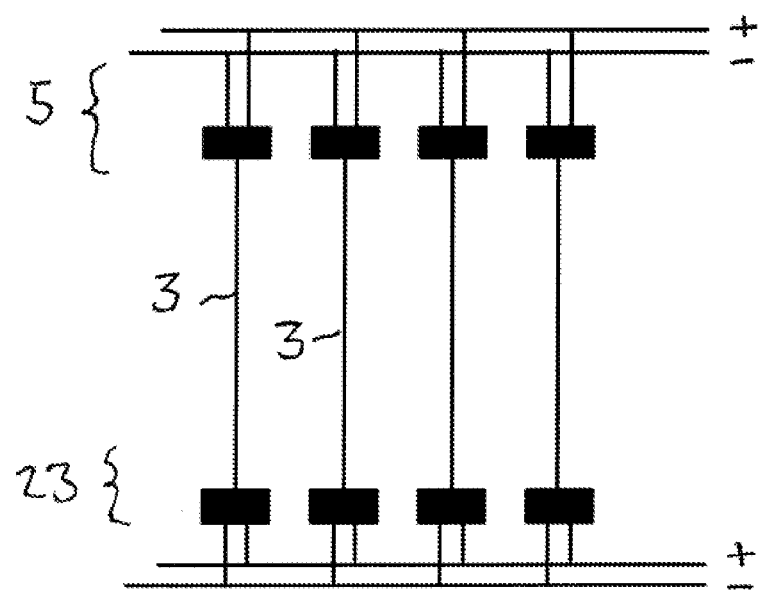

The figures show in:

FIGS. 1A to 3B in each case an exemplary embodiment of the stator winding according to the proposed principle, FIGS. 4 to 11 in each case an exemplary embodiment for the generation of current functions and the control thereof according to the proposed principle, FIGS. 12A to 13 exemplary embodiments for the distribution of the magnetomotive force according to the proposed principle, and FIGS. 14 to 25 in each case exemplary embodiments for the electric machines according to the proposed principle, and FIG. 26 an exemplary embodiment of a stator winding according to the proposed principle being supplied on two sides.

FIG. 1A shows an exemplary embodiment of a stator 1 in an electric machine configured as a rotating machine with inner rotor in a perspective illustration. In order to provide a good overview, the rotor is not depicted in FIG. 1A. The machine comprises on the inner side of the stator along the periphery slots 2 expanded in axial direction, into which in each case one conductor portion 3 of a stator winding is inserted. Here, exactly one conductor portion 3 is arranged in each slot 2.

FIG. 1B shows the stator winding with the parallel extending conductor portions 3 without the stator sheet metal package in order to provide a better visibility of the winding structure. As can seen, the conductor portions 3 in this embodiment are configured to be straight, have a rectangular cross-section and are distributed along the periphery of the machine. The conductor portions 3 have the same length and are oriented parallel to the machine axis. Each on one end, the conductor portions 3 are electrically short-circuited by means of a short-circuit ring 4. The free ends of the conductor portions 3 are connected to a power supply unit, which is not shown in FIG. 1B.

FIG. 2 shows the stator winding having the conductor portions 3 and the short-circuit ring 4 as well as symbolically a connected power supply unit 5, which is connected to one end of each of the conductor portions 3. Here, the power supply unit comprises in each case at least one power source 6 per conductor portion 3, for providing respective current functions or superimposed current functions. The example of FIG. 2 shows 18 conductor portions of the 36 conductor portions shown in the example of FIGS. 1A and 1B.

Figure 3B:
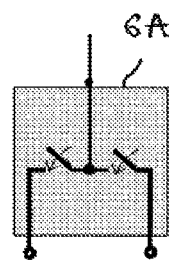

FIGS. 3A and 3B shows a simplified illustration of a power supply unit having half bridge switches 6A, by means of which the free ends of the conductor portions 3 can be switched to a positive or a negative supply voltage +/−. The control of the switches in the half bridges will be explained later.

Figure 4:
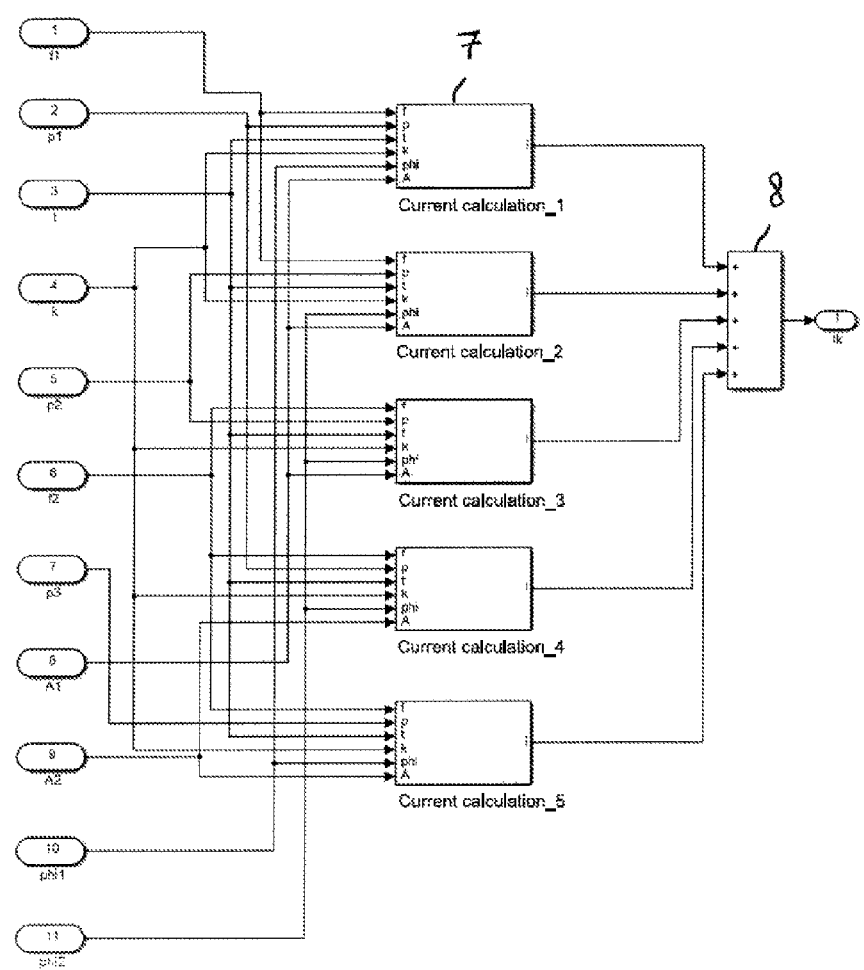

On this basis, FIG. 4 shows a first exemplary embodiment of a power supply unit for the control of a power regulator 9 for a conductor portion 3. Said power supply unit realizes the technical implementation of the equation for providing superimposed current functions as follows:

$$I_{S,k}(t) = \sum_{i=p_0}^{p_{max}} \sum_{j=f_0}^{f_{max}} A_{i,j,k}(t) \cdot \cos\left(2\pi j t - i(k-1)\frac{2\pi}{Q_s} + \varphi_{i,j,k}(t)\right)$$

Here, $I_{s,k}(t)$ is the time-dependent current course, i.e. the time-dependent current function in a conductor portion of the stator having consecutive numbering k, $A_{i,j,k}(t)$ is the time-dependent amplitude of each spectral component of the conductor portion k, wherein spectral component refers to a component of the current function for example in the case of a Fourier decomposition, j refers to the frequency of the spectral component; with $f_o$ being a first frequency and $f_{max}$ being the maximum occurring frequency, i refers to the pole pair number of the spectral component; with $p_o$ being a first pole pair number and $p_{max}$ being the maximum occurring pole pair number, $Q_s$ refers to the number of slots in the stator and thus also the number of conductor portions in the stator, $\varphi_{i,j,k}(t)$ refers to the time-dependent phase angle (referred to as phi1, phi2 in the drawings) of each spectral component of the conductor portion k, which determines the phase position.

There will be calculated n current functions, which is why a number of n current calculation units 7 is provided to that end. Each current calculation unit 7 comprises inputs, which are fed in each case with one or multiple operating parameters such as frequency f1, f2, pole pair number p1, p2, p3, consecutive parameters of the respective rod k, amplitudes A1, A2, phase angle phi1, phi2 and time t.

On the output side, each current calculation unit 7 provides a current function I(t) which depends on the selected conductor portion k, the respective frequency f1, f2 and the respective pole pair number p1, p2, p3 and other operating parameters. Said current functions I(t) are fed to a superposition unit 8 which provides a superimposed current function $I_k$ for the respective conductor portion k. Said function in turn is used to control the power regulator 9, which sets the height and the course of the current over time, which is fed into the conductor portion having the consecutive parameter k. Such a current regulation is performed for every conductor portion.

In this figure and in the following figures, the term rod is used synonymously with the term conductor portion of the description.

The time-dependent current course in each conductor portion can be regulated in any manner by means of the half bridges 6A of FIG. 3B. Depending on the optimization objective, different time courses may be generated and provided to the current regulators 9.

Figure 5:
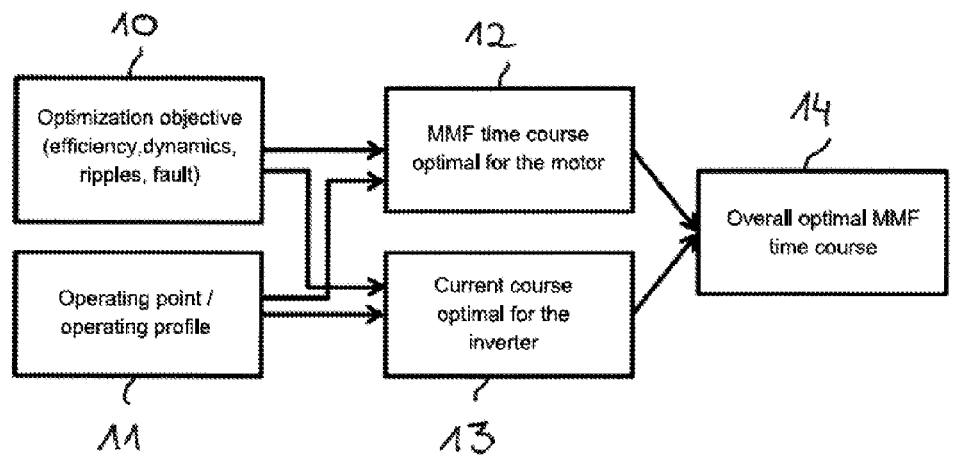

FIG. 5 shows an exemplary embodiment of a control scheme. Depending on an optimization objective 10 and an operating point or an operating profile 11, respectively, a time course of the magnetomotive force 12 optimal for the motor and a current course 13 optimal for the inverter are calculated. Optimization objectives may include efficiency, dynamics, ripples or a fault, for example. An overall optimum time course of the magnetomotive force 14 is calculated from the combination of the time course optimal for the motor and the current course optimal for the inverter.

Figure 6:
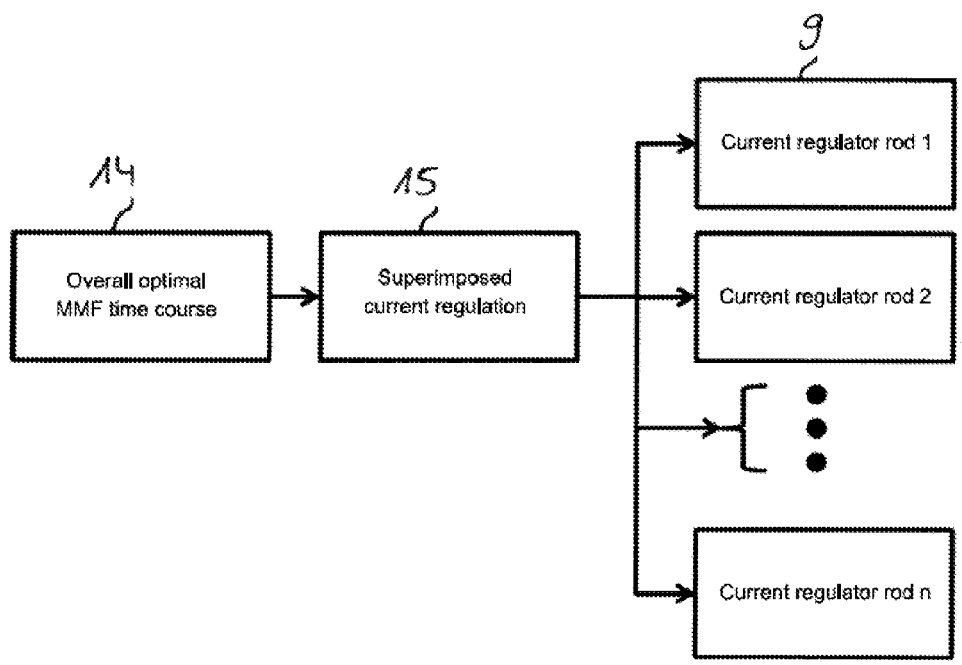

Desired time courses for the current regulator 9 for the respective conductor portion are generated by the superimposed current control 15 shown in FIG. 6 depending on the overall optimum time course of the magnetomotive force 14.

Figure 7:
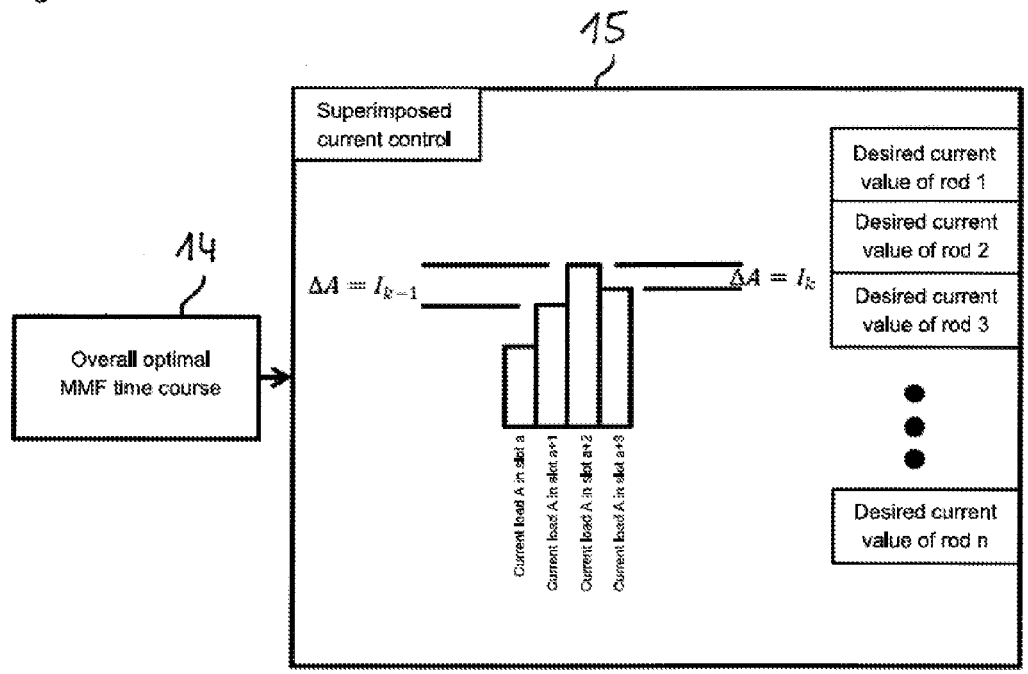

FIG. 7 shows a possible embodiment of the implementation of the superimposed current control compared to the configuration of FIG. 6. The control is again based on an overall optimum time course of the magnetomotive force 14. Said time course is supplied to a superimposed current control 15, which determines individual electric load values for the conductor portions of the respective slots. The desired current values for the conductor portions 1 to n are calculated from said load values.

The current functions have time courses of one or multiple basic waveforms which, for example, have a sinusoidal course, and are superimposed with different parameters such as respective amplitudes, phase position and frequencies. Here, not each of the frequency portions is to be directed to effect the motor, regenerative components may also be superposed.

Figure 8:
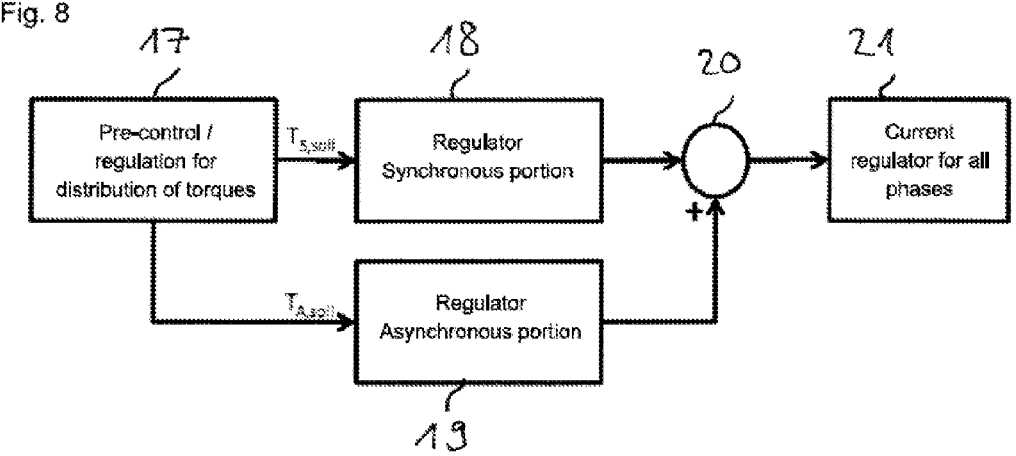

FIG. 8 shows an exemplary embodiment of a pre-control, which calculates a distribution of synchronous and asynchronous components of the desired torque. In detail, FIG. 8 shows a control for distributing moments 17, which controls a regulator for the synchronous portion 18 as well as a regulator for the asynchronous portion 19. The outputs of the regulators for the synchronous and asynchronous portion 18, 19 are brought together in a summation point 20, which in turn controls the current regulators 21 for all phases, i.e. all conductor portions. The pre-control 17 takes up a desired moment value and calculates the optimum distribution of the torque to asynchronous and synchronous components 18, 19 for the current operating point. Subordinated torque regulators determine desired currents, which are transmitted in a summarized form to the current regulator 21 in the summation point 20.

Figure 9:
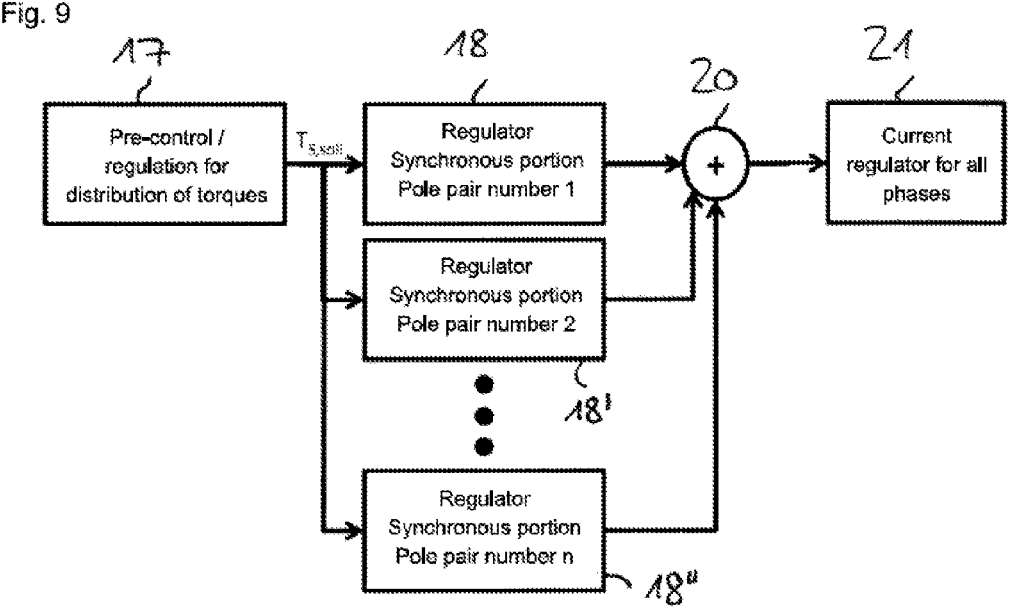

FIGS. 9 and 10 show further exemplary embodiments of the pre-control. Here, for the case of multiple different pole pair numbers, it is stated that relative to the regulator for the synchronous portion 18, which controls the synchronous portions for a pole pair number, further regulators for the synchronous portions for further pole pair numbers 18', 18" are connected in parallel. Said regulators are also controlled by the pre-control and regulation for moment distribution 17 and are also brought together in the summation knot 20.

In analogy, FIG. 10 shows the configuration for multiple pole pair numbers for the case of the asynchronous regulation. It can be seen that, relative to the regulator 19 for the asynchronous portion of a pole pair number, further regulators for controlling the asynchronous portions of further pole pair numbers 19', 19" are connected in parallel and are also controlled by the pre-control 17. In this case, the outputs of all regulators for the asynchronous portions of the different pole pair numbers 19 to 19" are brought together in the summation knot 20 as well.

FIG. 11 shows a combination of the embodiments of FIGS. 9 and 10. Thus, multiple regulators for synchronous portions per pole pair number 18, 18" as well as multiple regulators for asynchronous portions per pole pair number 19 to 19" are provided. In turn, said regulators are controlled by the pre-control 17 and their outputs are brought together in the summation knot 20.

FIGS. 12A and 12B show the distribution of the magnetomotive force MMF) plotted against the angle of the machine. Here, FIG. 12A shows the case of pole pair number p=2 and FIG. 12B shows the case of pole pair number p=1. The change of the number of pole pairs of the machine during operation allows to achieve the in each case best efficiency in the torque diagram.

In the present example, the number of stator slots is 36. At low revolutions and demand for a higher torque, the machine may be operated with a higher pole pair number p, for example p=2. However, in the case of higher revolutions, where the iron losses and also the skin and proximity losses become more and more dominant, the number of pole pairs p can be reduced to 1, which leads to a significant reduction of losses at higher revolutions.

As an alternative or in addition to the switching between the number of pole pairs, the present principle allows to generate multiple pole pairs and controlling them at the same time in the machine.

The following equation is an expression for the phase current in the slot k for the operation with multiple pole pairs.

$$I_{S,k}(t) = \sum_{i=p_0}^{p_{max}} \sum_{j=f_0}^{f_{max}} A_{i,j,k}(t) \cdot \cos\left(2\pi j t - i(k-1)\frac{2\pi}{Q_s} + \varphi_{i,j,k}(t)\right)$$

Here, the amplitude, frequency, and the number of pole pairs are variable parameters, i.e. operating parameters.

Figure 19:
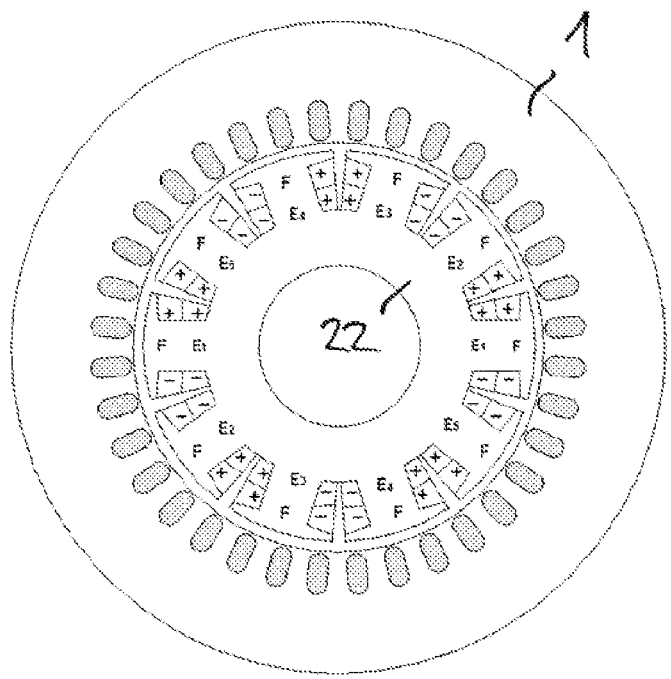
Figure 20:
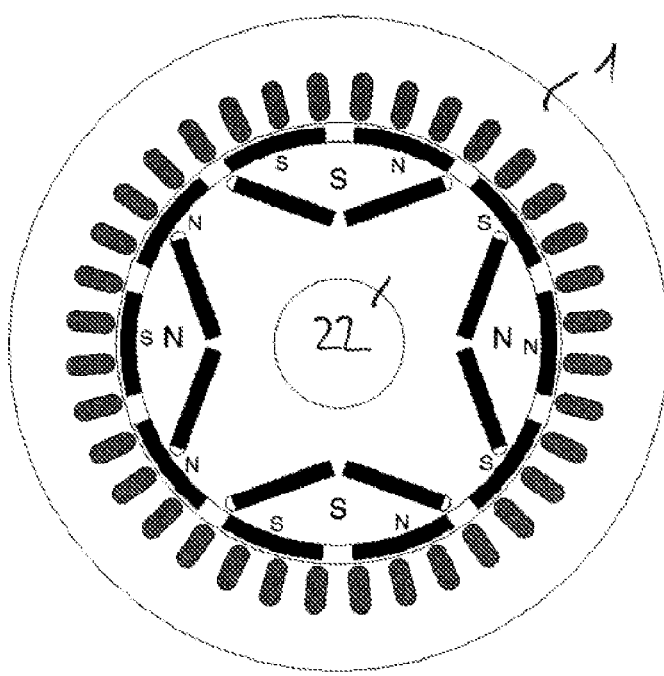

Depending on the operating mode and the machine type, these parameters may be adjusted separately. This may advantageously be used for example in the following operating modes and machine types:

Said principle can be applied in the case of the self-excited synchronous machine, where the operating shaft is used for generation of torque and a harmonic is used to transport energy into the rotor in order to generate a magnetic field there. In such machine types, the operating shaft and the rotor exciter shaft of the magnetomotive force can be controlled independently of one another. An exemplary embodiment of this machine is shown in FIG. 19. With respect to this configuration and further possible configurations of such synchronous machines in which the proposed principle can be applied, reference is made to the previous application DE 10 2013 102 900.0, filed on 21 Mar. 2013, incorporated herein in its entirety.

Figure 14:
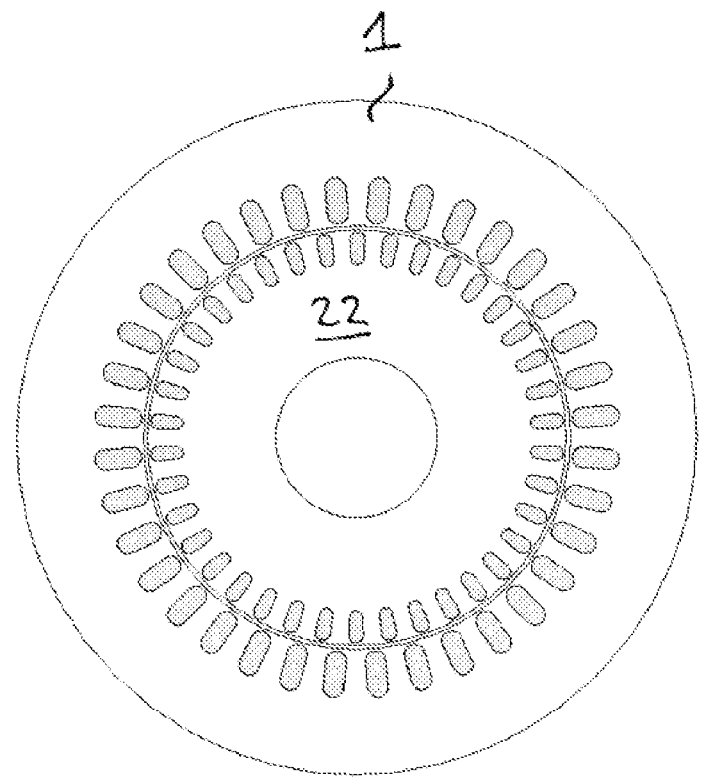

Another area of application is the asynchronous machine having multiple pole pairs. One example for such a machine is shown in FIG. 14. Said asynchronous machine can be operated with multiple pole pairs at the same time, provided that the rotational speed of all excited poles is equal. Said condition can be satisfied according to the proposed principle by varying the frequencies of the supply of corresponding poles. Of course, the contribution of each pole pair to the machine torque can also be adjusted by varying the phase current and the slippage.

Another exemplary area of application is permanent-magnet excited synchronous machines having multiple pole pairs. Examples are given in FIGS. 17 and 20. Here, magnets are positioned along the radius of the machine such that both a small number of pole pairs and a high number of pole pairs are generated. Depending on the operating point, the magnetomotive force of the stator can either address the lower or the higher pole pair number or both at the same time.

Figure 18:
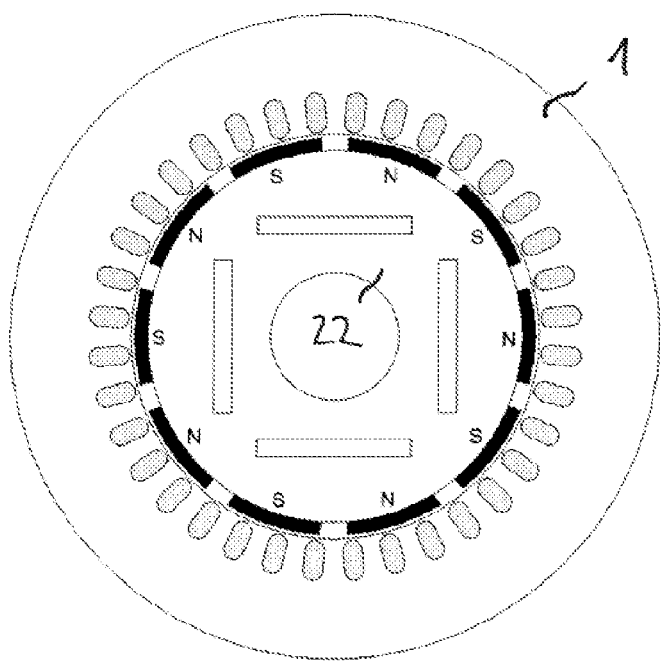
Figure 21:
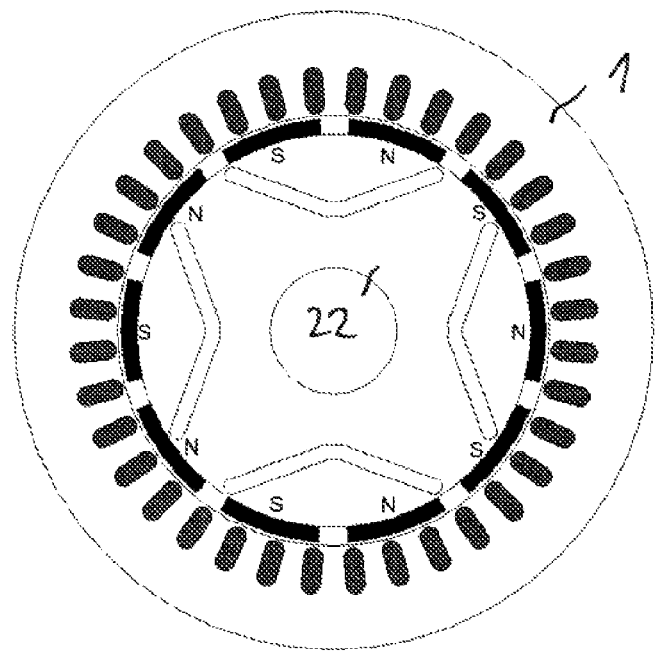

Another area of application is shown in FIG. 18 as an example. Here, a permanent-magnet supported reluctance machine is shown. This is a very common machine type, in which however conventionally the number of pole pairs of the reluctance part and of the permanent magnet machine part is identical. However, this is no longer required according to the proposed principle. The two components are not even required to be in the same phase any more. One exemplary embodiment for this case is shown in FIG. 21.

The proposed principle is also suitable for machines having a surface-mounted permanent magnet and a high harmonic overtone portion. Both the fundamental wave of the magnetomotive force of the rotor as well as its harmonic can be used to generate torque. Accordingly, the harmonics of the reluctance motor can also be used for generation of additional torque. The principle proposed can also be applied in hybrid machines, such as for example as a combined asynchronous and permanent magnet rotor, combined asynchronous and reluctance rotor, permanent magnet (PM) or reluctance rotor having multiple pole pairs and so on.

FIG. 13 shows an application in which two different pole pairs are generated at the same time. Simulations have been performed for the pole pair number p1=1 and p2=3. The upper half of the illustration of FIG. 13 shows the course of the magnetomotive force MMF plotted over the rotation angle of the machine, while the lower half of the image of FIG. 13 shows the distribution of the harmonic of the magnetomotive force. As can be discerned, there is a very low portion of overtones.

Control strategies for electric machines are conventionally directed at minimizing losses or maximizing the utilization of the available inverter voltage. Here, the load angle and the overall current are used as variable parameters to be optimized, while the number of pole pairs is assumed to be preset. Since this limitation is no longer valid, optimization can be achieved by means of the number of pole pairs according to the proposed principle. Since it may of course be possible that the optimum lies between two pole pair numbers, this may lead to implementing the two neighboring pole pair numbers with a weighing factor in order to detect the suitable ratio of the peak currents for both pole pair numbers. The transition between two pole pair numbers may be configured very smoothly. Particularly in the partial load operational range low values of the magnetic flux often lead to reduced losses in the machine and control. However, low flux means that the ability to spontaneously generate torque is very much lower than in machines with high flux. This may be overcome by increasing the number of pole pairs, if a change of desired torque value occurs, even if said value leads to a short loss situation. Said higher pole pair numbers can rapidly be reduced again, when the torque transient is over.

Figure 15:
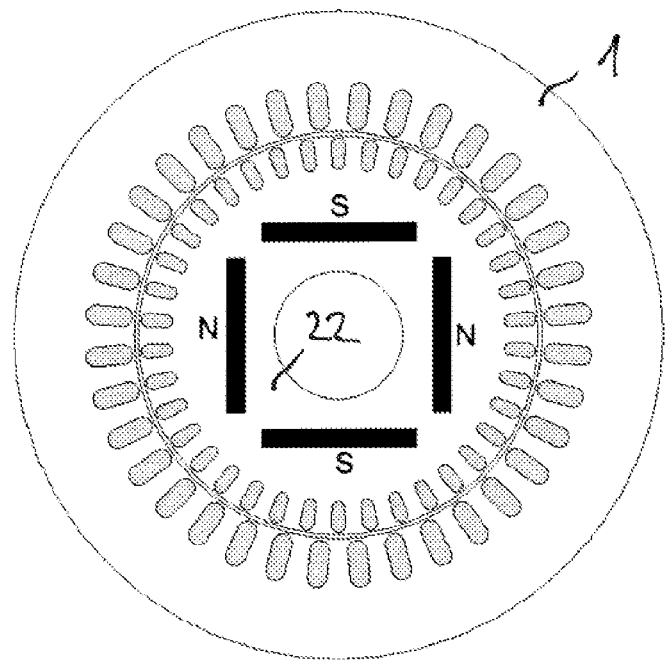

The option to separately adjust the amplitude and the frequency of each component of the magnetomotive force provides many options for new hybrid machine types, such as a PM supported asynchronous machine according to FIG. 15. Here, permanent magnets are positioned radially beneath the rods of the cage rotor. The induction machine is fed by a high pole pair number, while the permanent magnet (PM) part of the machine has a low pole pair number.

Figure 16:
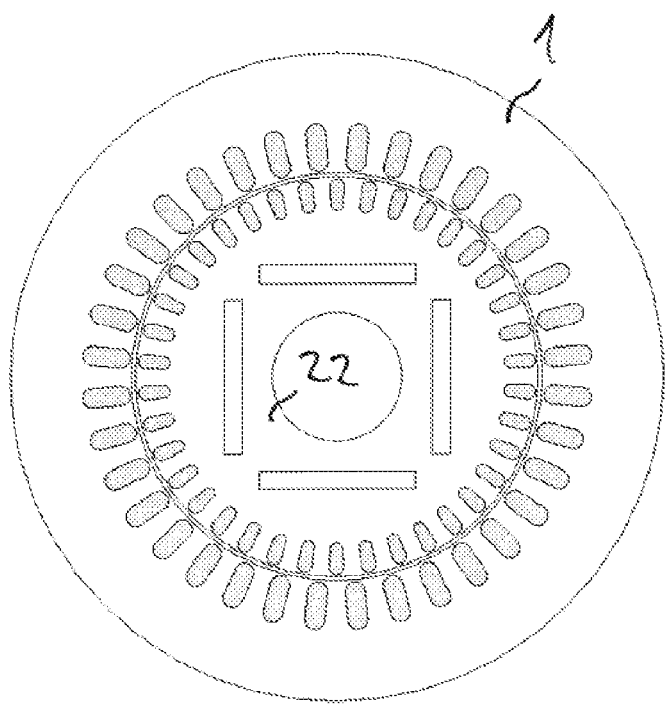
Figure 17:
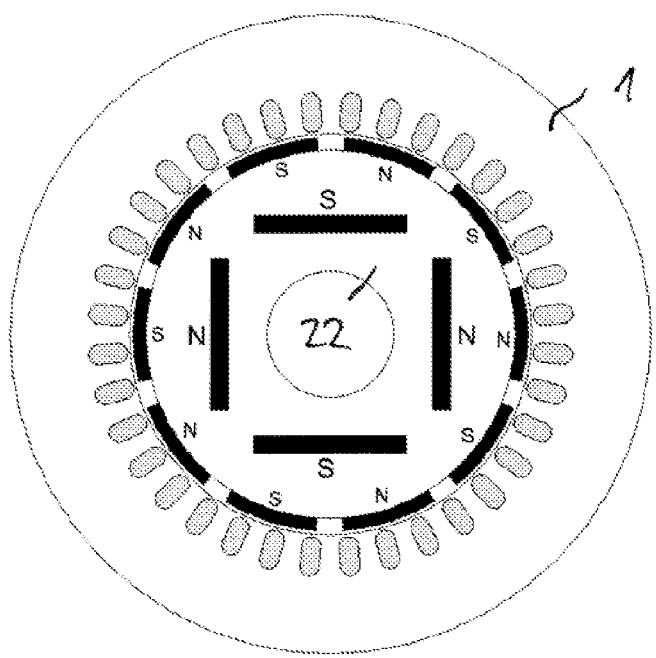
Figure 22:
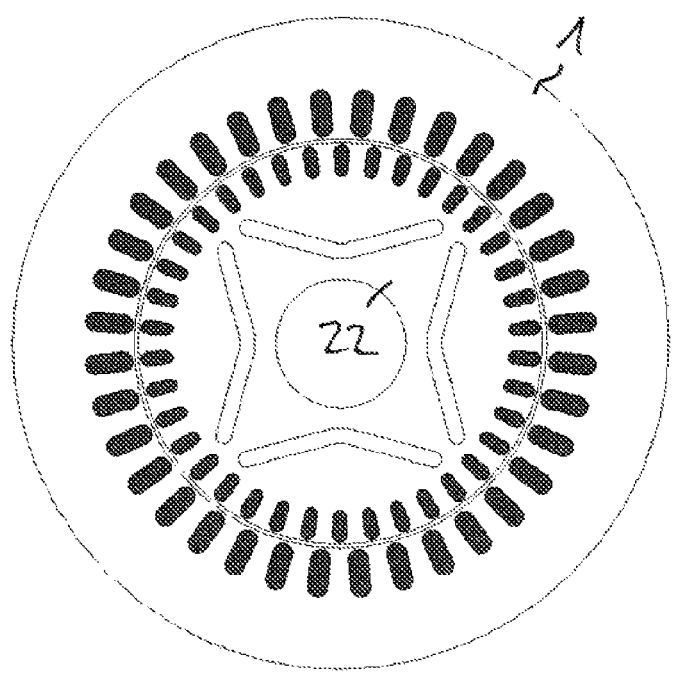

A similar situation is present in the case of the synchronous reluctance supported asynchronous machine according to FIG. 16 and FIG. 22. In this case, flux barriers are used in place of the magnets in order to realize a lower pole pair number.

Figure 23:
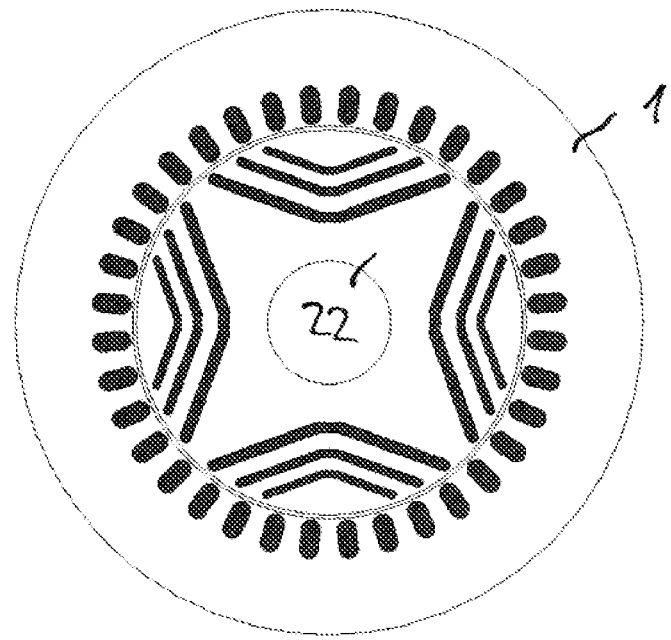

In a variation thereof, the flux barriers are filled with a conductive material. The resulting machine is shown in FIG. 23 as an example.

A new application is the synchronous supported asynchronous machine, which may be configured as shown in FIG. 25 in an exemplary manner. The same rules as in the PM supported asynchronous machine apply to this machine, however windings are placed in the rotor in place of the magnets.

The fundamental wave of all synchronous components of the magnetomotive force of the stator does not induce voltages into the rotor rods. Therefore, they do not generate a magnetomotive force of the rotor. In analogy, there is no interaction between the fundamental wave of the asynchronous components of the magnetomotive force of the stator and the portions of the magnetomotive force that relate to the permanent magnets, if their harmonic numbers do not match.

Another area of application of the proposed principle is the change of the number of the active phases, even during operation. The number of active phases can be changed in order to achieve minimum losses in the inverter, i.e. in the power supply unit. The active phases may symmetrically or asymmetrically be distributed over the stator. A symmetric distribution may be used to generate desired harmonics in the magnetomotive force of the stator. A permanent magnet (PM) rotor having 10 poles, for example, could be supplied by a stator having two poles only, provided that the stator generates a strong fifth harmonic.

A slightly asymmetric distribution of active phases can be used to reduce the harmonic components of the magnetomotive force by means of a so-called virtual coil pitch. For the case of opposed poles, this can mean that both poles are generated by the same number of active phases, but that the axis of symmetry between the poles is not identical to the geometric centre of the active phases. One exemplary embodiment hereof is shown in FIG. 24. In this case, the phases, i.e. the conductor portions, are activated and deactivated with a rotating pattern. The active phases are then fed by means of one of the above described equations with superimposed currents.

In deviation hereof, it is possible to use a fixed pattern in place of a rotating pattern of active and inactive phases rotating around the stator. This may for example either mean that a distribution of active and passive phases is provided over the entire motor periphery, symmetrically or asymmetrically, or that a sector motor is realized. In the latter case, neighboring phases may be active at twice the pole distance, for example, which generate the magnetomotive force of two poles then.

As already mentioned the operating mode of the proposed machine topology is variable and may be changed during operation. As a result, a most great range of the degree of efficiency of the machine for the different operating states is achieved. The different operating modes can not only be switched over in an abrupt manner during operation, but they can also merge into one another and be mixed with one another which enables completely new possibilities for the control of the machine.

For example, the reluctance-supported asynchronous machine of FIG. 16 may be operated as a pure synchronous reluctance machine for the operational case with high revolutions and low torque, while on the other hand it may be used as a pure induction machine for the operational case with low revolutions and high torque.

As mentioned above it is possible to achieve an asymmetric distribution of the magnetomotive force by switching off individual conductor portions of the winding of the stator. According to the proposed principle, the same effect is alternatively also possible in that nonsymmetrical distributions of the magnetomotive force are directly fed into the stator. This method may also be used to adapt the spectrum of the magnetomotive force to the desired operating point.

FIG. 26 shows an exemplary embodiment of a stator winding according to the proposed principle being fed from two sides. Accordingly, the conductor portions at one end each are connected to a first power supply unit 5. The respectively opposing ends of the conductor portions 3 are connected with another power supply unit 23. As a result, current functions or superimposed current functions may be fed into the conductor portions from two sides according to the proposed principle.

The invention claimed is:

1. A power supply unit for supplying multiple conductor portions of a stator winding of an electric machine inserted in respective slots, wherein
the power supply unit is configured to supply a first conductor portion and a second conductor portion with at least one different operating parameter of a respective current function, and/or
the power supply unit is configured to supply a conductor portion with at least two superimposed current functions, which in each case have at last one different operating parameter.

2. The power supply unit according to claim 1, wherein the conductor portions each have a terminal connected to the power supply unit, and another terminal
which is connected to a short circuit device, wherein the conductor portions are short-circuited to one another, or
which is connected to another power supply unit.

3. The power supply unit according to claim 1 or 2, wherein the operating parameters include at least one of a pole pair number, frequency, phase position and amplitude.

4. The power supply unit according to claim 1, which includes a superposition of at least two pole pairs.

5. The power supply unit according to claim 4, wherein the current function comprises different amplitudes for different pole pairs.

6. The power supply unit according to claim 4 or 5, wherein the current function comprises different frequencies for different pole pairs.

7. The power supply unit according to claim 1, which uses synchronous and asynchronous portions for generation of torque at the same time.

8. The power supply unit according to claim 1, wherein the number of pole pairs is changeable during operation.

9. The power supply unit according to claim 1, wherein the number of active phases is changeable during operation.

10. The power supply unit according to claim 1 wherein the number of the actively supplied conductor portions is changeable during operation.

11. The power supply unit according to claim 1, which is configured to supply the conductor portions of the stator winding with a pattern of active phases, wherein said pattern may be fixed, alternating or rotating, or a combination thereof.

12. The power supply unit according to claim 1, which is configured to supply the conductor portions with asymmetric distributions of the magnetomotive force.

13. The power supply unit according to claim 1, which is configured to generate time-dependent current courses for supplying the conductor portions, which conform to the following function:

$$I_{S,k}(t) = \sum_{i=p_0}^{p_{max}} \sum_{j=f_0}^{f_{max}} A_{i,j,k}(t) \cdot \cos\left(2\pi jt - i(k-1)\frac{2\pi}{Q_s} + \varphi_{i,j,k}(t)\right)$$

with $I_{s,k}(t)$ being the time-dependent current course, corresponding to the time-dependent current function in a conductor portion of the stator having consecutive numbering k, $A_{i,j,k}(t)$ being the time-dependent amplitude of each spectral component of the conductor portion k, wherein the spectral component refers to a component of the current function for example in the case of a Fourier decomposition, j being the frequency of the spectral component; with $f_o$ being a first frequency and $f_{max}$ being the maximum occurring frequency, i being the pole pair number of the spectral component; with $p_o$ being a first pole pair number and $p_{max}$ being the maximum occurring pole pair number, $Q_s$ being the number of slots in the stator and thus also the number of conductor portions in the stator, and $\phi_{i,j,k}(t)$ being the time-dependent phase angle of each spectral component of the conductor portion k.

14. An electric machine having a stator, comprising a power supply unit according to claim 1, wherein:
the stator comprises a multitude of slots for accommodating the stator winding,
in each case one conductor portion of the stator winding is inserted per slot,
the conductor portions are each connected to a terminal of the power supply unit on a second side of the stator, and
on a first side of the stator opposite the second side the conductor portions are short-circuited or connected to another power supply unit.

15. The electric machine according to claim 14, wherein each of the conductor portions inserted in the slots is straight.

16. The electric machine according to claim 14 or 15, wherein each of the conductor portions inserted in the slots include aluminum rods, cooper rods or bronze rods or alloys thereof.

* * * * *